(No Model.)

L. P. J. GERTENBACH & W. HAMPP.
COUPLING DEVICE FOR BICYCLE RIDERS.

No. 453,441. Patented June 2, 1891.

WITNESSES:
P. F. Eagles.
Wm. C. Wiedersheim.

INVENTORS
Louis P. J. Gertenbach
William Hampp
BY
Wm. C. Wiedersheim
ATTORNEY.

UNITED STATES PATENT OFFICE.

LOUIS P. J. GERTENBACH AND WILLIAM HAMPP, OF PHILADELPHIA, PENNSYLVANIA.

COUPLING DEVICE FOR BICYCLE-RIDERS.

SPECIFICATION forming part of Letters Patent No. 453,441, dated June 2, 1891.

Application filed February 17, 1891. Serial No. 381,752. (No model.)

*To all whom it may concern:*

Be it known that we, LOUIS P. J. GERTENBACH and WILLIAM HAMPP, citizens of the United States, both residing in the city and county of Philadelphia, State of Pennsylvania, have invented a new and useful Improvement in Coupling Devices for Bicycle-Riders, which improvement is fully set forth in the following specification and accompanying drawings.

Our invention consists of a device for coupling the riders of bicycles, whereby they may ride steadily together or in company as one on car-tracks, roads, &c., and rest themselves without dismounting.

Figure 1:
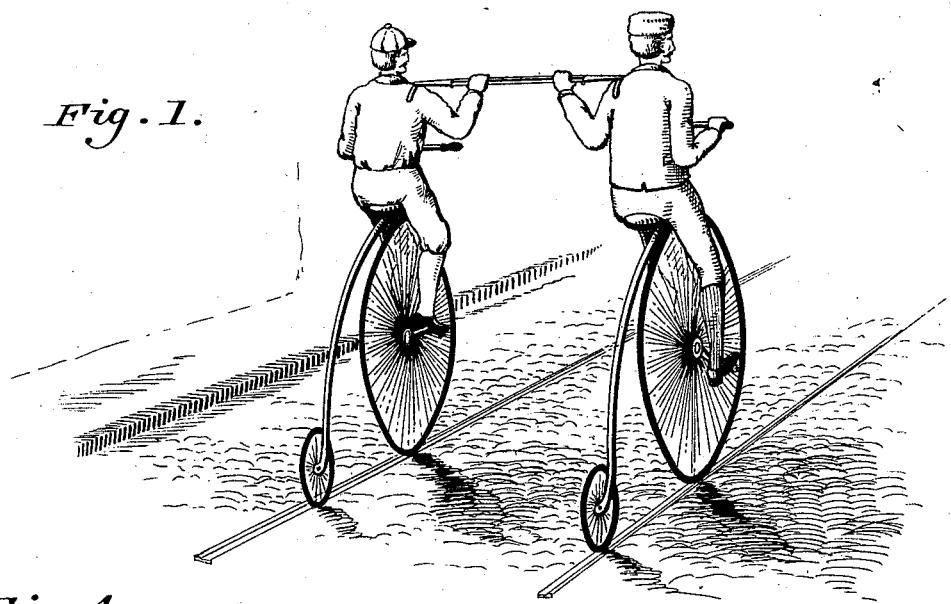
Figure 4:
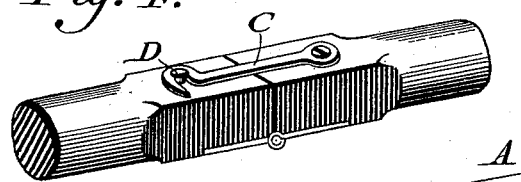
Figure 2:
Figure 3:
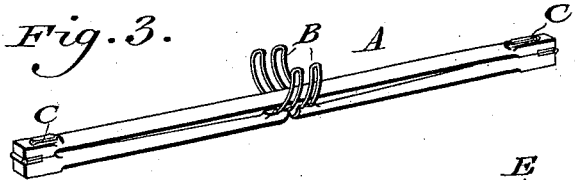
Figure 5:

Figure 1 represents a perspective view of a coupling device for bicycle-riders embodying our invention. Fig. 2 represents a perspective view of the device on an enlarged scale. Fig. 3 represents a perspective view of the device in folded condition. Fig. 4 represents a perspective view of a portion on an enlarged scale. Fig. 5 represents a perspective view of a portion of a modification.

Similar letters of reference indicate corresponding parts in the several figures.

Referring to the drawings, A designates a bar of suitable material, wood being preferred, and B designates arch-shaped pieces or transverse yokes on the ends thereof, the same being adapted to be seated on and be sustained by the shoulders of the riders of the two bicyles, as plainly shown in Fig. 1, whereby as said bar is grasped by the hands of the riders, the latter may steady and guide the bicycles and ride together as one on car-tracks, roads, &c., as well as in ruts, without liability of being thrown, the device also permitting the riders to preserve their distance and maintain a uniform speed, while they may also rest without dismounting. The bar is formed in sections, which are hinged together, as in Figs. 1, 2, 3, and 4, and held in operative position by hooks or catches C, which are mounted on either of the sections, and engage with eyes, pins, or heads D on the contiguous sections, it being evident that when the catches are released the sections may be folded and form a compact bundle, which may be strapped to either bicycle, carried by one of the riders, or otherwise disposed of. In Fig. 5 one of the sections is shown with a socket D to receive the end of the contiguous or adjacent section, the sections being connected by a pin E, which, secured to one section, occupies a slot F in the other section, it being evident that the sections may be readily disconnected, bundled, and afterward connected so as to be in condition for service.

The shoulder-pieces are secured to the bar in any suitable manner, the means employed in the present case being castings or heads G, which receive the crowns of the pieces, and are screwed or otherwise connected with the ends of the bar.

Having thus described our invention, what we claim as new, and desire to secure by Letters Patent, is—

1. A coupling device for bicycle-riders, consisting of a bar having end yokes adapted to rest on the bodies of riders in company, substantially as described.

2. In a coupling device, substantially as described, pieces or yokes adapted to be seated on the bodies of riders in company, and a sectional bar carrying said pieces or yokes at the ends thereof, said parts being combined substantially as described.

3. In a coupling device, substantially as described, pieces or yokes adapted to be seated on the bodies of riders in company, a jointed bar carrying said pieces or yokes, and means for holding said bar rigid, substantially as described.

4. A coupling device for bicycle-riders in company, consisting of a folding bar having yokes on the ends thereof, substantially as described.

LOUIS P. J. GERTENBACH.
WILLIAM HAMPP.

Witnesses:
JOHN A. WIEDERSHEIM,
A. P. JENNINGS.